(12) United States Patent
D'Anzi et al.

(10) Patent No.: US 11,309,550 B2
(45) Date of Patent: Apr. 19, 2022

(54) LEAKS CONTAINMENT EMBODIMENT FOR ELECTROCHEMICAL STACK

(71) Applicants: Angelo D'Anzi, Medicina (IT); Maurizio Tappi, Cesena (IT); Gianluca Piraccini, Cesena (IT); Carlo Alberto Brovero, Alexandria, VA (US)

(72) Inventors: Angelo D'Anzi, Medicina (IT); Maurizio Tappi, Cesena (IT); Gianluca Piraccini, Cesena (IT); Carlo Alberto Brovero, Alexandria, VA (US)

(*) Notice: Subject to any disclaimer, the term of this patent is extended or adjusted under 35 U.S.C. 154(b) by 172 days.

(21) Appl. No.: 16/498,400

(22) PCT Filed: Mar. 27, 2018

(86) PCT No.: PCT/US2018/024483
§ 371 (c)(1),
(2) Date: Sep. 27, 2019

(87) PCT Pub. No.: WO2018/183269
PCT Pub. Date: Oct. 4, 2018

(65) Prior Publication Data
US 2020/0044262 A1    Feb. 6, 2020

Related U.S. Application Data

(60) Provisional application No. 62/476,962, filed on Mar. 27, 2017.

(51) Int. Cl.
*H01M 8/24*     (2016.01)
*H01M 8/0258*   (2016.01)
*H01M 8/04082*  (2016.01)
*H01M 8/04746*  (2016.01)
*H01M 8/18*     (2006.01)

(52) U.S. Cl.
CPC ..... *H01M 8/0258* (2013.01); *H01M 8/04201* (2013.01); *H01M 8/04746* (2013.01); *H01M 8/188* (2013.01)

(58) Field of Classification Search
CPC .. H01M 8/0258; H01M 8/026; H01M 8/0202; H01M 8/04201; H01M 8/04082; H01M 8/04746; H01M 8/04753; H01M 8/188; H01M 8/184; H01M 8/18
See application file for complete search history.

(56) References Cited

U.S. PATENT DOCUMENTS

| | | | | |
|---|---|---|---|---|
| 2003/0087156 A1* | 5/2003 | Broman | ............. | H01M 4/8626 429/235 |
| 2012/0244405 A1* | 9/2012 | Shigematsu | .......... | H01M 50/77 429/105 |
| 2016/0149236 A1* | 5/2016 | D'Anzi | ................. | H01M 8/188 429/81 |

* cited by examiner

*Primary Examiner* — Raymond Alejandro
(74) *Attorney, Agent, or Firm* — Michael J. Foycik, Jr.

(57) ABSTRACT

A flow battery having a first tank for an anode electrolyte, a second tank for a cathode electrolyte, respective hydraulic circuits provided with corresponding pumps for supplying electrolytes to specific planar cells, provided with channels at the two mutually opposite faces for the independent conveyance of the electrolyte, mutually separated by a membrane-electrode assembly, the planar cells are provided with a drain channel, all the planar cells constituting a laminar pack, at least one end plate of the laminar pack there being aligned to an end plate provided with at least one drain hole connected to the respective electrolyte tank.

5 Claims, 3 Drawing Sheets

PRIOR ART

LEAKS CONTAINMENT EMBODIMENT FOR ELECTROCHEMICAL STACK

CROSS REFERENCE TO RELATED APPLICATIONS

This application claims the priority of Provisional Application No. 62/476,962 filed on Mar. 27, 2017, entitled "NOVEL LEAKS CONTAINMENT EMBODIMENT FOR ELECTROCHEMICAL STACK". The entire disclosure of this provisional patent application is hereby incorporated by reference thereto, in its entirety.

TECHNICAL FIELD

The present invention relates to a flow battery stack comprising a novel bipolar plate design having a leaks containment embodiment.

BACKGROUND OF THE INVENTION

A flow battery is a type of rechargeable battery in which electrolytes that contain one or more dissolved electroactive substances flow through an electrochemical cell, which converts the chemical energy directly into electric energy. The electrolytes are stored in adapted external tanks and are pumped through the cells of the reactor.

Redox flow batteries have the advantage of having a flexible layout (due to the separation of the power components and of the energy components), a long life cycle, rapid response times, noo need to smooth the charge and no harmful emissions.

Flow batteries are used for stationary applications with an energy demand between 1 kWh and several MWh: they are used to smooth the load of the grid, where the battery is used to accumulate during the night energy at low cost and return it to the grid when it is more expensive, but also to accumulate power from renewable sources such as solar energy and wind power, to then provide it during peak periods of energy demand.

In particular, a vanadium Redox battery includes a set of electrochemical cells in which the two electrolytes are separated by a proton exchange membrane. Both electrolytes are based on vanadium: the electrolyte in the positive half-cell contains $V<4+>$ and $V<5+>$ ions while the electrolyte in the negative half-cell contains $V<3+>$ and $V<2+>$ ions. The electrolytes can be prepared in several ways, for example by electrolytic dissolution of vanadium pentoxide (V2O5) in sulfuric acid (H2SO4). The solution that is used remains strongly acidic. In vanadium flow batteries the two half-cells are furthermore connected to storage tanks that contain a very large volume of electrolyte, which is made to circulate through the cell by use of adapted pumps. Such circulation of liquid electrolytes requires a certain amount of space occupation and limits the possibility of using vanadium flow batteries in mobile applications, in practice confining them to large fixed installations.

While the battery is being charged, in the positive half-cell the vanadium is oxidized, converting $V<4+>$ into $V<5+>$. The removed electrons are transferred to the negative half-cell, where they reduce the vanadium from $V<3+>$ to $V<2+>$. During use, the process occurs in reverse and one obtains a potential difference of 1.41 V at 25° C. in an open circuit.

The vanadium Redox battery is the only battery that accumulates electric energy in the electrolyte and not on the plates or electrodes, as occurs commonly in all other battery technologies.

Differently from all other batteries, in the vanadium Redox battery the electrolyte contained in the tanks, once charged, is not subjected to auto-discharge, while the portion of electrolyte that is stationary within the electrochemical cell is subject to auto-discharge over time.

The quantity of electric energy stored in the battery is determined by the volume of electrolyte contained in the tanks.

According to a particularly efficient specific constructive solution, a vanadium Redox battery includes a set of electrochemical cells within which the two electrolytes, mutually separated by a polymeric membrane, flow. Both electrolytes are constituted by an acidic solution of dissolved vanadium. The positive electrolyte contains $V<5+>$ and $V<4+>$ ions, while the negative one contains $V<2+>$ and $V<3+>$ ions. While the battery is being charged, in the positive half-cell the vanadium oxidizes, while in the negatives half-cell the vanadium is reduced. During the discharge step, the process is reversed. The connection of multiple cells in an electrical series allows to increase the voltage across the battery, which is equal to the number of cells multiplied by 1.41 V.

During the charging phase, in order to store energy, the pumps are turned on, making the electrolyte flow within the electrochemical cell creating a positive pressure in the related cell. The electric energy applied to the electrochemical cell facilitates proton exchange by means of the membrane, charging the battery.

During the discharge phase, the pumps are turned on, making the electrolyte flow inside the electrochemical cell, creating a positive pressure in the related cell thus releasing the accumulated energy.

During the time of operation of the battery, leaks of electrolyte occur on the stack in proximity of the gaskets 3 that seal the cells. These leaks cause corrosion and loss of capacity in the long term.

BACKGROUND ART

FIG. 1 illustrates an example of section of a stack constituted of two end plates 1 and 8, and a number of electrochemical cells connected in series composed of a number of separators 6, a number of anodic electrodes and cathodic electrodes, a number of membranes with protonic exchange 2, a number of current collectors 5 and a number of gaskets 3. Opposite poles 7, 7 are shown, in which the uppermost pole 7 is a positive pole, and the lowermost pole 7 is a negative pole.

During the operation of the battery, by means of two pumps, the electrolyte is pumped into the stack where a positive pressure is created. That pressure is created in the portion of the battery where the electrodes and the flow fields are located, also called the membrane-electrode assembly. The gaskets 3 serve the purpose to avoid the spillage of drops from the stack.

However, with time, leaks 4 (shown as arrows 4) start through the gaskets 3 that will cause corrosion and in the long term a considerable loss of capacity.

In many cases trays containing substances suitable for neutralizing acids are installed below the stack to collect leaks, but these remedies are inconclusive and hardly effective.

These leaks call for frequent maintenance by specialized personnel and cause higher costs of operation of the batteries.

The neutralized electrolyte collected in the containment trays is classified as hazardous waste and demands costly treatment and disposal.

The leaks of electrolyte can also represent a health hazard due to their high acidity.

SUMMARY OF THE INVENTION

The aim of the present invention is to solve the problems described above, by providing a flow battery that includes a groove in the cell separator with the purpose of collecting and draining all leaks back into the electrolyte tanks, and therefore is safer as well as less expensive than batteries of the known type, and is much less subject to failures and malfunctions.

Within this aim, an object of the invention is to provide a flow battery in which the delivery and performance of maintenance operations is quick, affordable and efficient.

A further object of the present invention is to provide a flow battery that has low costs, is relatively simple to provide in practice, and is safe in application.

BRIEF DESCRIPTION OF THE DRAWINGS

Further characteristics and advantages of the invention will become better apparent from the description of a preferred but not exclusive embodiment of the flow battery according to the invention, illustrated by way of non limiting example in the accompanying drawings, wherein.

DESCRIPTION OF EMBODIMENTS

Figure 1:
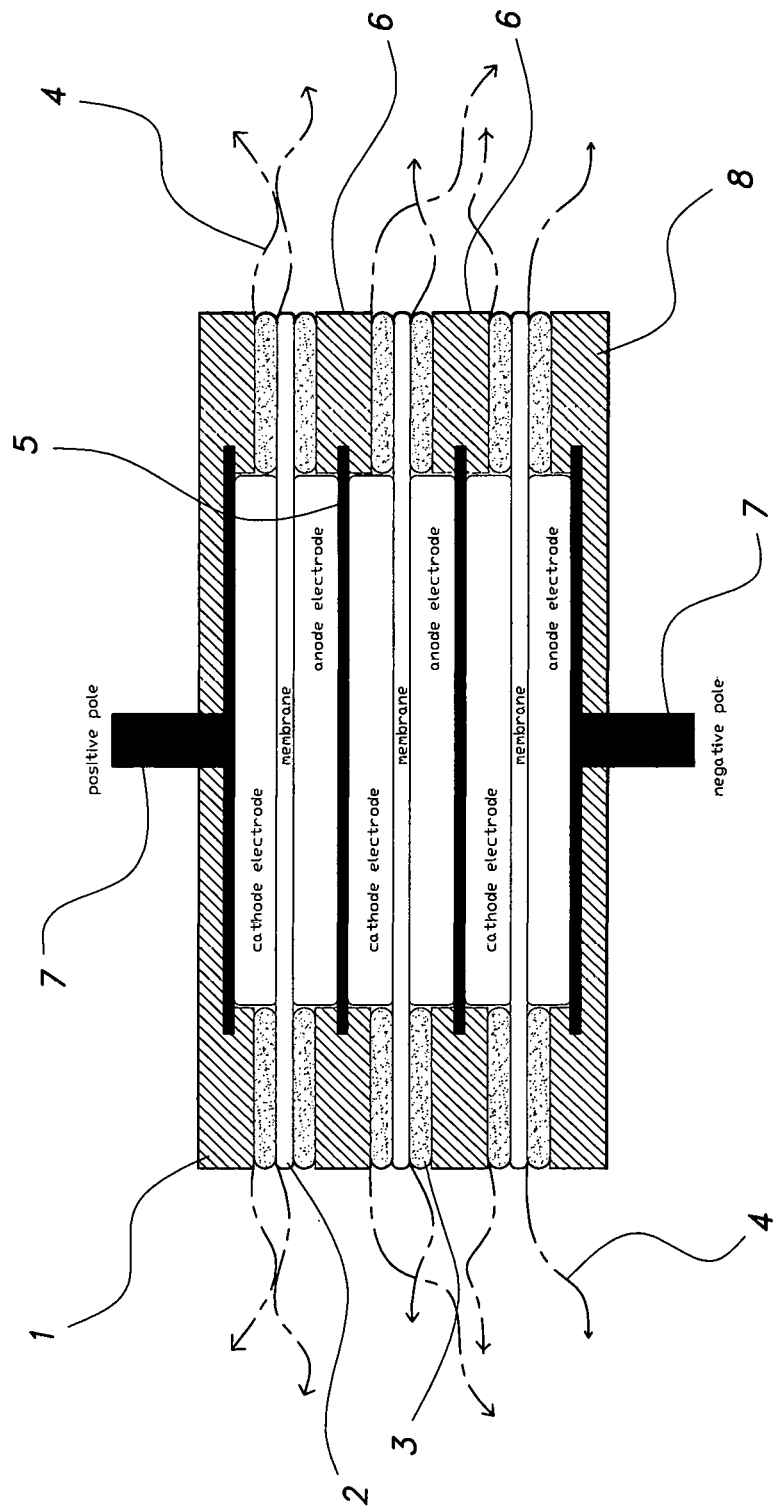
FIG. 1 is a schematic section view of a flow battery stack according to the state of the art.

With reference to the figures mentioned above, FIG. 2 illustrates in general terms a flow battery stack according to the present invention. The flow battery stack includes an uppermost end plate 9 and a lowermost end plate 24. A plurality of cells are provided, which can be arbitrarily selected, which are described in detail below.

These plates 9 and 24 respectively bound contain an undefined number of planar cells respectively composed of a series of cathode electrodes 15, a series of membranes with protonic exchange 16, a series of separator plates provided with channels 19, a series of anode electrodes 17, a series of primary gaskets 14, a series of secondary gaskets 18, all the above constitute respectively hydraulic circuits provided with corresponding pumps (not shown) for the supply of electrolytes to the planar cells. The end plates 9 and 24 are each provided with respective access channels 11, 13 and respective discharge outlets 10, 12 for the two mutually opposite faces of the end plates 9 and 24 for the independent conveyance of the electrolytes, and wherein the cells are mutually separated by respective protonic membranes 16 and respective anode electrodes 17 and cathode electrodes 15.

Figure 2:
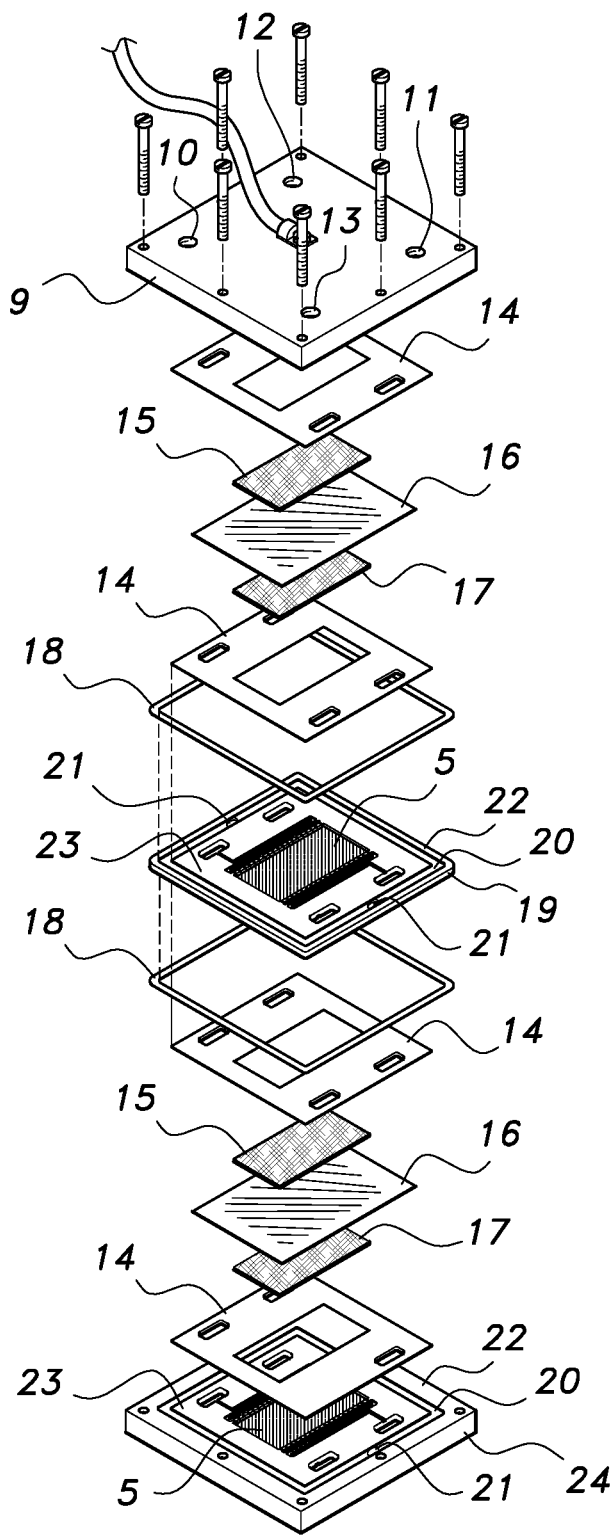
FIG. 2 is a schematic axonometric view of a flow battery according to the present invention.

FIG. 2 also shows a plurality of current collectors 5 disposed above the cathode electrodes 15.

The planar cells of the battery stack are mutually aligned and stacked so as to constitute a laminar pack.

An uppermost end plate 9 is arranged on at least one front of the laminar pack.

The uppermost end plate 9 is provided with at least one access channel (two access channels 11, 13 are shown) for entry of the electrolytes that arrive from the electrolyte tanks (not shown) by means of two pumps (not shown), and the end plate 9 has at least one discharge outlet (two discharge outlets 10, 12 are shown), the channels 11, 13 and 10, 12 being connected to the respective tanks (inlet and outlet tanks, not shown).

During the operation of the battery, in the laminar pack in proximity to the electrodes 15 and 17, the flow of electrolyte creates a positive pressure. That pressure is sealed by means of the primary gasket 14. The primary gasket 14 can be composed of a number of separate gaskets while still remaining within the scope of this invention.

Each separator plate 19 has a surface 22 which is provided with at least one channel 20 which runs along the perimeter of the plate 19, as well as at least one drain hole 21. In FIG. 2, the channel 20 is generally rectangular and is disposed close to the outermost edge of the plate 19. Also in FIG. 2, two drain holes 21 are shown.

The laminar pack as described above is assembled by inserting a secondary gasket 18 between the separator plates 19. The secondary gasket 18 rests on the outermost perimeter of the separator plate 19 in correspondence to the surface 22 of the plate 19.

The primary gaskets 14 and separator plates 19 have four openings (unnumbered) disposed at the corners thereof, which when stacked correspond to the access channels 11 and 13, and the discharge outlets 10 and 12 of the end plates 9 and 24 and enable fluid communication to the stack and from the stack.

A membrane-electrode assembly constituted by at least two electrodes 15 and 17 and a membrane with protonic exchange membrane 16 is inserted respectively between the separator plates 19.

The above-mentioned membrane-electrode assembly is stacked on the separator plate 19 by means of at least one primary gasket 14 that rests on the surface 22 of the separator plate 19.

The primary gaskets 14 seal the fluidic circuit of the electrolyte flowing within the above-mentioned membrane-electrode assembly.

The primary gasket 14 and the secondary gasket 18 can also be an individual one, and still remaining within the scope of the present invention.

On the separator plates 19 between the coupling planes (surfaces) 22 there is a free space. In this free space there is an electrolyte drainage channel 20 as described above.

Alternatively, the drainage channel 20 can be realized on the gasket itself, while still remaining within the scope of the present invention.

Figure 3:
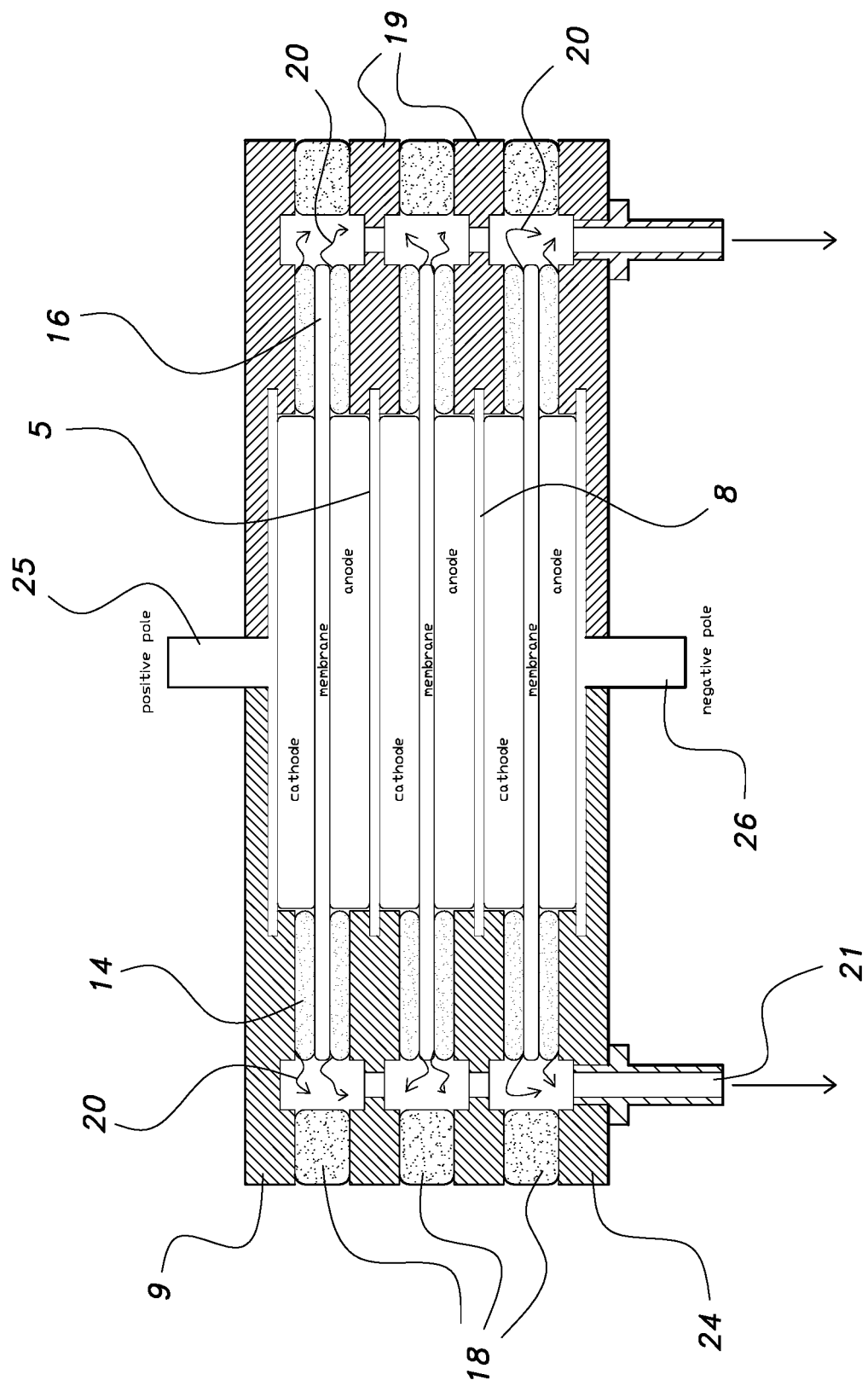
FIG. 3 is a schematic section view of a flow battery stack according to the invention.

As shown in FIG. 3, within the laminar pack in correspondence to all the drainage channels 20, a secondary circuit is created where leaks 4 are collected. The flow of leaks is shown by the arrows in FIG. 3, which collect in the channels 20 and then drain out through the drain holes 21. FIG. 3 shows an outlet connector (not numbered) disposed extending from the bottom of the lowermost end plate 24.

The leaks 4 drain in the junction channel 21 and by means of a pipe (not shown) flow back into the tanks.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A flow battery, comprising:
   an anode electrolyte and a cathode electrolyte;
   a first tank for containing said anode electrolyte, said first tank having a first outlet;
   a second tank containing said cathode electrolyte, said second tank having a second outlet;
   a plurality of electrolytic membranes and electrodes,
   a plurality of planar cells, each of said plurality of planar cells having two mutually opposite faces, and each respective one of said plurality of planar cells respectively having plural respective channels on each of said two mutually opposite faces for independent conveyance of said anode electrolyte and said cathode electrolyte, said plurality of planar cells being mutually separated by said plurality of electrolytic membranes and electrodes,
   a plurality of hydraulic circuits and a plurality of pumps, each of said plurality of hydraulic circuits having a respective one of said plurality of pumps for supplying said anode electrolyte and said cathode electrolyte to respective ones of said plurality of planar cells;
   wherein said plurality of planar cells are mutually aligned and stacked so as to constitute a laminar pack, said laminar pack having a front side;
   an end plate being disposed on said front side of said laminar pack, said end plate having at least one access channel adapted to enable access of said anode electrolyte and said cathode electrolyte that are supplied to said laminar pack, and said end plate having at least one discharge channel adapted for conveyance of said anode electrolyte and said cathode electrolyte from said access channel to at least one of said first outlet of said first tank and said second outlet of said second tank, and
   at least one drainage channel that receives leakage of said anode electrolyte and said cathode electrolyte from said plurality of planar cells, and wherein said drainage channel is connected to one of said first tank and said second tank to return said leakage to said one of said first tank and said second tank.

2. The flow battery according to claim 1, further comprising a drainage circuit, wherein said drainage circuit has at least one of said plurality of planar cells provided with said drain channel and a further drain channel respectively on each side of said at least one of said plurality of planar cells, each drain channel and said further drain channel having a respective drain hole, wherein each of said drain channel and said further drain channel are mutually aligned.

3. The flow battery according to claim 2, further comprising a junction channel of said end plate, and wherein said drain holes are aligned to said junction channel of said end plate.

4. The flow battery according to claim 1, further comprising a primary gasket and a secondary gasket, and a free space between said primary gasket and said secondary gasket, said free space constituting said drainage channel.

5. The flow battery according to claim 1, wherein said drain hole of said drain plate having at least one connection pipe to a collecting tank.

* * * * *